United States Patent [19]

Laudano

[11] 4,428,970

[45] Jan. 31, 1984

[54] MULTI-COLORED FREEZE-DRIED COFFEE AND A PROCESS FOR PRODUCING THE SAME

[75] Inventor: Raymond J. Laudano, Armonk, N.Y.

[73] Assignee: General Foods Corporation, White Plains, N.Y.

[21] Appl. No.: 363,717

[22] Filed: Mar. 30, 1982

[51] Int. Cl.$^3$ .............................. A23F 5/32
[52] U.S. Cl. .................... 426/385; 426/594; 426/388
[58] Field of Search ............. 426/385, 388, 594

[56] References Cited

U.S. PATENT DOCUMENTS

| | | | |
|---|---|---|---|
| 3,493,388 | 2/1970 | Hair | 426/388 X |
| 3,493,389 | 2/1970 | Hair et al. | 426/388 |
| 3,966,979 | 6/1976 | Katz et al. | 426/385 |
| 4,053,652 | 10/1977 | Mahlmann | 426/388 |

OTHER PUBLICATIONS

Sivetz et al., Coffee Processing Technology, 1963, Avi:- Westport, Conn. vol. I–pp. 242, 474; vol. II–pp. 132–137.

Sivetz, Coffee Origin and Use, 1973, Coffee Publications, Corvallis, Oregon, Chap. 8, pp. 1–2, 12–14.

*Primary Examiner*—Joseph M. Golian
*Attorney, Agent, or Firm*—Thomas V. Sullivan; Richard L. Crisona; Thomas R. Savoie

[57] ABSTRACT

A process for producing a freeze-dried coffee with a multi-colored appearance resembling that of roast and ground coffee involves freezing a layer of coffee extract by a method which provides a dark-colored freeze-dried coffee, adding a thin layer of liquid to the frozen extract and rapidly freezing the combined layers. The frozen coffee material is subsequently freeze-dried, producing the multi-colored coffee with an appearance resembling that of roast and ground coffee.

5 Claims, No Drawings

MULTI-COLORED FREEZE-DRIED COFFEE AND A PROCESS FOR PRODUCING THE SAME

DESCRIPTION

Cross Reference to Related Applications

This application is related to my application, Ser. No. 363,718, filed concurrently herewith.

Technical Field

The present invention relates to a process for producing a freeze-dried coffee with a multi-colored appearance resembling that of roast and ground coffee. More particularly, this invention involves freezing a layer of coffee extract by a method which provides a dark-colored freeze-dried coffee, adding a thin layer of liquid to the frozen extract and rapidly freezing the combined layers. The frozen coffee material is subsequently freeze-dried.

Background of Art

It has long been recognized in the art that rapid freezing of an aqueous substance will promote the distribution of a great number of small ice crystals and slow freezing provides a lesser number of larger ice crystals. As applied to freeze-dried coffee, it is known that a rapidly frozen coffee extract containing the smaller ice crystals yields a light-colored soluble coffee whereas a slowly frozen extract containing larger ice crystals provides a darker freeze-dried coffee.

Much effort has been directed towards producing the dark-colored freeze-dried coffee through controlled freezing because the darker color is preferred as compared to the light-colored freeze-dried coffee. A method of freezing coffee extract on a chilled metal belt is disclosed in U.S. Pat. No. 3,253,420 of De George wherein freezing of the coffee extract takes place over an approximately 15 minute period. Another method of freezing, disclosed in U.S. Pat. No. 3,399,061 of Lutz, involves agitating the coffee extract while chilling it from its ice point to a temperature below its eutectic point over a period of between 15 minutes and 30 minutes. Though these processes provide a dark-colored freeze-dried coffee, they are slow and limiting on productivity.

More rapid methods of freezing coffee extracts are known. For instance, U.S. Pat. No. 3,443,963 of Simon et al. describes a process wherein coffee extract is first chilled to about minus 5° C. and held at that temperature for 20 minutes prior to rapid freezing. Another disclosure, U.S. Pat. No. 3,966,979 of Katz et al., describes a multi-layered freezing process wherein the upper portion of a fast frozen extract layer is melted by having a layer of warm coffee extract placed on top and both layers are then slowly frozen prior to the addition of the next layer. So too, commonly assigned U.S. Pat. App. No. 353,280 of Hudak filed on Mar. 1, 1982, discloses a multi-step freezing process wherein the extract is slushed and subsequently warmed prior to freezing, as a means of obtaining a dark-colored freeze-dried coffee.

It has typically been felt that a dark-colored freeze-dried coffee more nearly resembles the appearance of roast and ground coffee as compared to a light-colored freeze-dried coffee. Inspection of roast and ground coffee reveals that it is in fact comprised of particles having a variety of colors ranging from light to dark. It is an object of the present invention to provide a process for producing a freeze-dried coffee with a multi-colored appearance resembling that of roast and ground coffee.

Disclosure of the Invention

A process for producing a freeze-dried coffee with a multi-colored appearance has now been discovered wherein a layer of coffee extract is frozen by a method which produces a dark-colored freeze-dried coffee, a thin layer of liquid is added thereto, and the combined layers are rapidly frozen. The frozen coffee material is subsequently freeze-dried to provide the multi-colored freeze-dried coffee.

It is necessary to initially freeze a layer of coffee extract by a method which produces a dark-colored product. The methods hereinbefore described are all suitable for this step of the present invention. Basically, the method chosen, such as slow freezing, must be one which promotes the growth of larger ice crystals, which larger ice crystals are recognized as providing a dark-colored freeze-dried coffee. Freezing of the initial coffee extract layer may be carried out on a fixed chilled surface but is preferably carried out on a continuous, moving chilled metal belt as described in U.S. Pat. No. 3,253,420 of De George. As it is desirable to maximize productivity, it is preferred to use one of the freezing methods such as are disclosed in U.S. Pat. No. 3,443,963 of Simon et al. or commonly assigned U.S. Pat. App. No. 353,280 of Hudak.

Once the initial layer of coffee extract has been frozen by a suitable method, a thin layer of liquid is added to the surface of the frozen coffee extract layer. The purpose of adding the liquid is to melt the surface of the frozen coffee extract whereby the surface and thin liquid layer may then be rapidly re-frozen. The frozen coffee material is then comprised of a layer of coffee extract which has been frozen by a method providing a dark-colored product, a portion of which layer has been melted and rapidly re-frozen. As hereinbefore noted, rapid freezing provides a light-colored freeze-dried coffee. Thus, the frozen coffee material contains a portion which will provide a dark-colored freeze-dried coffee as well as a portion which will provide a light-colored soluble coffee when said frozen coffee material is freeze-dried. The frozen coffee material also contains the thin liquid layer which is simply removed during drying.

The liquid layer is added in an amount sufficient to melt only the surface of the frozen coffee extract layer without melting too deeply into said extract layer. It is desirable to control both the thickness of the liquid layer and the temperature at which it is added in order to insure the proper operation of the present invention. A thin liquid layer of between 1 mm and 3 mm has been found to be convenient. The preferable temperature range has been discovered to be between 2° C. and 21° C. There is an obvious relationship between the thickness of the liquid layer and the temperature at which it is added in order to melt a given depth of the initially frozen coffee extract layer.

The liquid which is added as the thin liquid layer may be either water or a dilute aqueous coffee extract. As pointed out above, an object of adding the liquid layer is to melt the surface of the frozen coffee extract which is followed by the rapid freezing of the melted portion as well as the thin liquid layer. It has now been discovered that water and dilute aqueous coffee extract are suited to being rapidly frozen subsequent to the addition to the frozen coffee extract layer. The dilute aqueous coffee extract should be at a concentration less than about 10% by weight solids to be effective in the present process. If the solids concentration is appreciably above 25% by weight, the thin layer may not freeze rapidly enough, impairing the efficiency of the process.

A worker skilled in the art will realize that the many embodiments of the present invention involve the manipulation of the depth of the liquid layer, the temperature at which said layer is added and the composition of the liquid. The central constraint that should be maintained is addition of sufficient liquid at the proper temperature to melt the surface of the frozen coffee extract layer while at the same time providing for the subsequent rapid freezing of the melted extract surface as well as the thin liquid layer.

After the thin liquid layer is added and the coffee material is completely frozen, said coffee material may be ground prior to freeze drying. Such grinding provides for homogeneous distribution of what will be the light-colored and dark-colored particles subsequent to drying. The freeze drying operation involves maintaining the frozen coffee material under sufficiently reduced pressure whereby the frozen water in the extract is sublimated directly from the solid to the vapor state. An example of this method of drying coffee extract is described in U.S. Pat. No. 3,365,806 of Pfluger et al. Alternatively, the frozen coffee material may be freeze-dried as a layer and the dried product ground to provide the freeze-dried coffee with a multi-colored appearance resembling that of roast and ground coffee.

The most preferred embodiment of the present invention involves initially freezing a layer of aqueous coffee extract between 6 mm and 20 mm thick by placing the extract on a continuous, moving metal belt chilled along its length by a plurality of aqueous brine reservoirs which brine reservoirs are maintained at progressively lower temperatures between minus 8° C. and minus 40° C. Liquid water is added to the surface of the frozen aqueous coffee extract layer at a temperature between 2° C. and 21° C. Said water is preferably added as a spray or mist at a point between one-half and two-thirds along the length of the belt from the point at which the aqueous coffee extract is added to said belt. The frozen coffee material is ground as it discharges from the metal belt and the ground coffee material is subsequently freeze-dried.

Freeze-dried coffee particles of at least three different colorations are seen to result from the method of the present invention. As hereinabove described, the frozen coffee extract is comprised of two layers, a light- and a dark-colored layer, after the addition of the thin liquid layer. So, on grinding, particles are formed at least from the dark-colored layer and from the light-colored layer, giving two distinct particle colorations. A third coloration is provided from that portion of the frozen extract comprising the boundary of the light- and dark-colored layers. Particles produced therefrom will be dark-colored on certain faces and light-colored on others. The three colorations are mixed homogeneously during grinding so that upon drying, a freeze-dried coffee having the appearance of roast and ground coffee is produced.

The following examples are intended to illustrate certain embodiments of the present invention. The examples are not meant to limit this invention beyond what is claimed below.

EXAMPLE 1

1. A 19 mm deep layer of aqueous coffee extract (25% by weight soluble solids) was placed in a stainless steel tray maintained at a temperature of minus 30° C. The coffee extract was frozen solid by maintaining the minus 30° C. temperature for a period of 130 minutes whereupon, the chilling was stopped.

2. A 2 mm deep layer of dilute coffee extract (10% by weight soluble solids) at a temperature of about 7° C. was added to the surface of the frozen coffee extract, melting the very upper portion thereof.

3. The coffee material of step 2 was rapidly frozen solid by lowering the temperature of the tray to minus 30° C. once again.

4. The frozen coffee material was reduced in size by forcing the frozen material through an 8 mesh (U.S. Standard Sieve Screen). The size-reduced frozen material was shaken so as to produce a uniform mixture of the different colored particles.

5. The frozen material was freeze-dried in a laboratory freeze-dryer maintained at a pressure of about 250 microns and a platen temperature of 42° C. for a period of 16 hours.

The resulting freeze-dried coffee was characterized as having a multi-colored appearance resembling that of roast and ground coffee.

EXAMPLE 2

The procedure of Example 1 was substantially repeated although water was substituted for the 10% by weight coffee extract used in step 2.

The resulting freeze-dried coffee was characterized as having a multi-colored appearance resembling that of roast and ground coffee.

What is claimed is:

1. A process for producing a freeze-dried coffee with a multi-colored appearance resembling that of roast and ground coffee which comprises:
   (a) freezing a layer of aqueous coffee extract by a means which produces a dark-colored freeze-dried coffee;
   (b) adding a thin layer of liquid water to the surface of the frozen coffee extract layer whereby the upper portion of said layer is melted;
   (c) rapidly freezing solid the liquid added to the coffee extract layer and that portion of the layer that was melted;
   (d) grinding the frozen coffee material of step (c);
   (e) freeze drying the ground frozen coffee material of step (d).

2. The freeze-dried coffee with a multi-colored appearance resembling that of roast and ground coffee, which freeze-dried coffee is produced by the process of claim 1.

3. The process of claim 1 wherein the liquid is added to the surface of the frozen coffee extract layer at a temperature between 2° C. and 21° C.

4. The process of claim 1 wherein the liquid is added to the surface of the frozen coffee extract layer as a fine spray or mist whereby the liquid forms a thin layer less than 3 mm thick.

5. A process for producing a freeze-dried coffee having a multi-colored appearance resembling that of roast and ground coffee which comprises:
   (a) freezing a layer of aqueous coffee extract between 6 mm and 20 mm thick by placing said extract on a continuous, moving metal belt chilled by a plurality of aqueous brine reservoirs which brine reservoirs are maintained at progressively lower temperatures between minus 8° C. and minus 40° C.;

(b) adding water as a fine spray or mist at a temperature between 2° C. to 21° C. to the surface of the frozen aqueous coffee extract layer which addition is at a point between one-half and two-thirds along the length of said belt from the point at which the aqueous coffee extract is added to the belt;

(c) grinding the frozen coffee material which is discharged from the belt;

(d) freeze drying the ground frozen coffee material of step (c).

* * * * *